(12) United States Patent
Hesse et al.

(10) Patent No.: US 12,127,051 B2
(45) Date of Patent: Oct. 22, 2024

(54) DEVICE, METHOD, APPARATUS AND COMPUTER READABLE MEDIUM FOR INTER-MASTER NODE HANDOVER

(71) Applicant: Nokia Technologies Oy, Espoo (FI)

(72) Inventors: Matthias Hesse, Drebach (DE); Krzysztof Kordybach, Pulawy (PL); Jiaoli Min, Beijing (CN); Przemyslaw Zdrowak, Wroclaw (PL); Jurgen Mayer, Blaustein (DE); Yonggang Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 4 days.

(21) Appl. No.: 17/641,844

(22) PCT Filed: Sep. 27, 2019

(86) PCT No.: PCT/CN2019/108418
§ 371 (c)(1),
(2) Date: Mar. 10, 2022

(87) PCT Pub. No.: WO2021/056387
PCT Pub. Date: Apr. 1, 2021

(65) Prior Publication Data
US 2024/0049071 A1 Feb. 8, 2024

(51) Int. Cl.
*H04W 4/00* (2018.01)
*H04W 36/00* (2009.01)

(52) U.S. Cl.
CPC .......... *H04W 36/00692* (2023.05); *H04W 36/00695* (2023.05); *H04W 36/00698* (2023.05); *H04W 36/0072* (2013.01)

(58) Field of Classification Search
CPC ..... H04W 36/00692; H04W 36/00695; H04W 36/0072
See application file for complete search history.

(56) References Cited

U.S. PATENT DOCUMENTS

2017/0134998 A1* 5/2017 Xu ................... H04W 36/0058
2018/0035339 A1* 2/2018 Mitsui ................ H04W 36/18
(Continued)

FOREIGN PATENT DOCUMENTS

CN    107925931 A    4/2018
CN    108990116 A    12/2018
(Continued)

OTHER PUBLICATIONS

3GPP TS 36.423 V15.6.0 (Jul. 2019), "3rd Generation Partnership Project; Technical Specification Group Radio Access Network; Evolved Universal Terrestrial Radio Access Network (E-UTRAN); X2 application protocol (X2AP) (Release 15)", cover and pp. 19-95.
(Continued)

*Primary Examiner* — Abdelnabi O Musa
(74) *Attorney, Agent, or Firm* — Harrington & Smith

(57) ABSTRACT

Embodiments of the present disclosure relate to for handover. In response to reception of a request for handover of a second device from a third device to a first device, the first device transmit to the third device an indication that a radio bearer for the second device is to be changed from a split bearer terminated in a fourth device to a Master Cell Group bearer terminated in the first device, the second device being in dual connectivity with the third and fourth devices. The first device receives from the third device a transmission status of data associated with the radio bearer.

13 Claims, 8 Drawing Sheets

(56) References Cited

U.S. PATENT DOCUMENTS

| | | | | |
|---|---|---|---|---|
| 2018/0213450 | A1* | 7/2018 | Futaki | H04W 16/32 |
| 2020/0059395 | A1* | 2/2020 | Chen | H04W 28/082 |
| 2020/0205042 | A1* | 6/2020 | Ryu | H04W 36/08 |
| 2020/0351968 | A1* | 11/2020 | Yilmaz | H04W 76/19 |
| 2021/0274587 | A1* | 9/2021 | Jung | H04W 76/30 |
| 2022/0053390 | A1* | 2/2022 | Kim | H04W 36/00695 |
| 2022/0159483 | A1* | 5/2022 | Lee | H04W 76/19 |
| 2022/0287126 | A1* | 9/2022 | Orsino | H04W 76/20 |
| 2023/0164871 | A1* | 5/2023 | Jung | H04W 12/0433 370/328 |

FOREIGN PATENT DOCUMENTS

| | | |
|---|---|---|
| CN | 109246770 A | 1/2019 |
| WO | WO 2018/182240 A1 | 10/2018 |
| WO | WO-2018/231136 A1 | 12/2018 |
| WO | WO 2019/031948 A1 | 2/2019 |
| WO | WO 2019/066628 A1 | 4/2019 |

OTHER PUBLICATIONS

3GPP TSG-RAN WG3 #88, Fukuoka, Japan, May 25-29, 2015, R3-151147, "Correction on TR 36.875", ZTE, 4 pgs.

"CR on Clarification on path switch request for inter MN HO without SN change", NTT DOCOMO, INC., 3GPP TSG-RAN WG#105, R3-193371, Aug. 2019, 5 pages.

"(TP for BL CR for TS 37.340)Necessity on path switch request for inter MN HO without SN change", NTT DOCOMO, INC., 3GPP TSG-RAN WG3 #102, R3-186612, Nov. 2018, 8 pages.

* cited by examiner

DEVICE, METHOD, APPARATUS AND COMPUTER READABLE MEDIUM FOR INTER-MASTER NODE HANDOVER

CROSS REFERENCE TO RELATED APPLICATION

This patent application is a U.S. National Stage application of International Patent Application Number PCT/CN2019/108418 filed Sep. 27, 2019, which is hereby incorporated by reference in its entirety.

FIELD

Embodiments of the present disclosure generally relate to the field of telecommunication and in particular, to a device, method, apparatus and computer readable medium for inter-Master Node handover.

BACKGROUND

In New Radio (NR), a terminal device may operate in a multiple radio dual connectivity (MR-DC) mode in which the terminal device may be connected to nodes or network devices of multiple radio access technologies (RATs). MR-DC may comprise E-UTRA-NR Dual Connectivity (EN-DC). In EN-DC, a terminal device may have one connection to an eNode B (eNB) acting as a master node (MN) and another connection to an en-gNB acting as a secondary node (SN).

The terminal device may have a plurality of Master Cell Group (MCG) bearers terminated in the eNB and a plurality of split radio bearers terminated in the en-gNB. Via an Inter-Master Node handover procedure, the terminal device may be handed over to a target eNB without secondary node change. During the Inter-Master Node handover, part of split radio bearers terminated in the en-gNB may be kept. For example, the target eNB may request keeping a subset of split radio bearers terminated in the en-gNB. For another example, the en-gNB may decide to keep only a subset of the split bearers and inform target eNB of it.

The above two cases may lead to a partial admission of split radio bearers terminated in the en-gNB. If the target eNB decides not to keep a radio bearer as a split radio bearer terminated in the en-gNB but as an MCG bearer terminated in the target eNB, the target eNB may perform a bearer type change from the split radio bearer terminated in the en-gNB with or without data forwarding during the handover procedure. In this case, the target eNB will need transmission statuses of data associated with the bearer that subject to the bearer type change. How to obtain the transmission statuses of data associated with the bearer still needs to be discussed.

SUMMARY

In general, example embodiments of the present disclosure provide a solution for handover.

In a first aspect, there is provided a first device. The first device comprises at least one processor; and at least one memory including computer program codes; the at least one memory and the computer program codes are configured to, with the at least one processor, cause the first device to: in response to reception of a request for handover of a second device from a third device to the first device, transmit to the third device an indication that a radio bearer for the second device is to be changed from a split bearer terminated in a fourth device to a Master Cell Group bearer terminated in the first device, the second device being in dual connectivity with the third and fourth devices; receive from the third device a transmission status of data associated with the radio bearer.

In a second aspect, there is provided a first device. The first device comprises at least one processor; and at least one memory including computer program codes; the at least one memory and the computer program codes are configured to, with the at least one processor, cause the first device to: coordinate a radio bearer for a second device with a fourth device, the radio bearer to be changed from a split bearer terminated in the fourth device to a Master Cell Group bearer terminated in the first device, the second device being in dual connectivity with the third and fourth devices and to be handed over from a third device to the first device; receive from a fourth device a transmission status of data associated with the radio bearer; transmit to the fourth device information concerning tunnel endpoints in the first device for the radio bearer; and receive the data from the fourth device via the tunnel endpoints.

In a third aspect, there is provided a third device. The third device comprises at least one processor; and at least one memory including computer program codes; the at least one memory and the computer program codes are configured to, with the at least one processor, cause the third device to: in response to transmitting to a first device a request for handover of a second device from the third device to the first device, receive an indication that a radio bearer for the second device is to be changed from a split bearer terminated in a fourth device to a Master Cell Group bearer terminated in a first device, the second device being in dual connectivity with the third and fourth devices; receive from the fourth device a transmission status of data associated with the radio bearer; and transmit to the first device the transmission status of data associated with the radio bearer.

In a fourth aspect, there is provided a fourth device. The fourth device comprises at least one processor; and at least one memory including computer program codes; the at least one memory and the computer program codes are configured to, with the at least one processor, cause the fourth device to: in response to handover of a second device from a third device to a first device, transmit to the third device an indication that a radio bearer for the second device is to be changed from a split bearer terminated in the fourth device to a Master Cell Group bearer terminated in the first device, the second device being in dual connectivity with the third and fourth devices; and transmit to the third device a transmission status of data associated with the radio bearer.

In a fifth aspect, there is provided a fourth device. The fourth device comprises at least one processor; and at least one memory including computer program codes; the at least one memory and the computer program codes are configured to, with the at least one processor, cause the fourth device to: coordinate a radio bearer for a second device with a first device, the radio bearer to be changed from a split bearer terminated in the fourth device to a Master Cell Group bearer terminated in the first device, the second device being in dual connectivity with the third and fourth devices and to be handed over from a third device to the first device; transmit to a first device a transmission status of data associated with the radio bearer; receive from the first device information concerning tunnel endpoints in the first device for the radio bearer; and transmit the data to the first device via the tunnel endpoints.

In a sixth aspect, there is provided a method implemented at a device. The method comprises: in response to reception of a request for handover of a second device from a third device to a first device, transmitting from the first device to the third device an indication that a radio bearer for the second device is to be changed from a split bearer terminated in a fourth device to a Master Cell Group bearer terminated in the first device, the second device being in dual connectivity with the third and fourth devices; receiving from the third device a transmission status of data associated with the radio bearer.

In a seventh aspect, there is provided a method implemented at a device. The method comprises: coordinating, at a first device, a radio bearer for a second device with a fourth device, the radio bearer to be changed from a split bearer terminated in the fourth device to a Master Cell Group bearer terminated in the first device, the second device being in dual connectivity with the third and fourth devices and to be handed over from a third device to the first device; receiving from a fourth device a transmission status of data associated with the radio bearer; transmitting to the fourth device information concerning tunnel endpoints in the first device for the radio bearer; and receiving the data from the fourth device via the tunnel endpoints.

In an eighth aspect, there is provided a method implemented at a device. The method comprises: in response to transmitting from a third device to a first device a request for handover of a second device from the third device to the first device, receiving an indication that a radio bearer for the second device is to be changed from a split bearer terminated in a fourth device to a Master Cell Group bearer terminated in a first device, the second device being in dual connectivity with the third and fourth devices; receiving from the fourth device a transmission status of data associated with the radio bearer; and transmitting to the first device the transmission status of data associated with the radio bearer.

In a ninth aspect, there is provided a method implemented at a device. The method comprises: in response to handover of a second device from a third device to a first device, transmitting from a fourth device to the third device an indication that a radio bearer for the second device is to be changed from a split bearer terminated in the fourth device to a Master Cell Group bearer terminated in the first device, the second device being in dual connectivity with the third and fourth devices; and transmitting to the third device a transmission status of data associated with the radio bearer.

In a tenth aspect, there is provided a method implemented at a device. The method comprises: coordinating, at a fourth device, a radio bearer for a second device with a first device, the radio bearer to be changed from a split bearer terminated in the fourth device to a Master Cell Group bearer terminated in the first device, the second device being in dual connectivity with the third and fourth devices and to be handed over from a third device to the first device; transmitting to a first device a transmission status of data associated with the radio bearer; receiving from the first device information concerning tunnel endpoints in the first device for the radio bearer; and transmitting the data to the first device via the tunnel endpoints.

In an eleventh aspect, there is provided an apparatus. The apparatus comprises means for in response to reception of a request for handover of a second device from a third device to a first device, transmitting to the third device an indication that a radio bearer for the second device is to be changed from a split bearer terminated in a fourth device to a Master Cell Group bearer terminated in the first device, the second device being in dual connectivity with the third and fourth devices; means for receiving from the third device a transmission status of data associated with the radio bearer.

In a twelfth aspect, there is provided an apparatus. The apparatus comprises means for coordinating, at a first device, a radio bearer for a second device with a fourth device, the radio bearer to be changed from a split bearer terminated in the fourth device to a Master Cell Group bearer terminated in the first device, the second device being in dual connectivity with the third and fourth devices and to be handed over from a third device to the first device; means for receiving from a fourth device a transmission status of data associated with the radio bearer; means for transmitting to the fourth device information concerning tunnel endpoints in the first device for the radio bearer; and means for receiving the data from the fourth device via the tunnel endpoints.

In a thirteenth aspect, there is provided an apparatus. The apparatus comprises means for in response to transmitting from the third device to a first device a request for handover of a second device from the third device to the first device, receiving an indication that a radio bearer for the second device is to be changed from a split bearer terminated in a fourth device to a Master Cell Group bearer terminated in a first device, the second device being in dual connectivity with the third and fourth devices; means for receiving from the fourth device a transmission status of data associated with the radio bearer; and means for transmitting to the first device the transmission status of data associated with the radio bearer.

In a fourteenth aspect, there is provided an apparatus. The apparatus comprises means for in response to handover of a second device from a third device to a first device, transmitting from a fourth device to the third device an indication that a radio bearer for the second device is to be changed from a split bearer terminated in the fourth device to a Master Cell Group bearer terminated in the first device, the second device being in dual connectivity with the third and fourth devices; and means for transmitting to the third device a transmission status of data associated with the radio bearer.

In a fifteenth aspect, there is provided an apparatus. The apparatus comprises means for coordinating, at a fourth device, a radio bearer for a second device with a first device, the radio bearer to be changed from a split bearer terminated in the fourth device to a Master Cell Group bearer terminated in the first device, the second device being in dual connectivity with the third and fourth devices and to be handed over from a third device to the first device; means for transmitting to a first device a transmission status of data associated with the radio bearer; means for receiving from the first device information concerning tunnel endpoints in the first device for the radio bearer; and means for transmitting the data to the first device via the tunnel endpoints.

In a sixteenth aspect, there is provided a computer readable medium comprising a computer program for causing an apparatus to perform at least the method according to any of the above sixth to tenth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
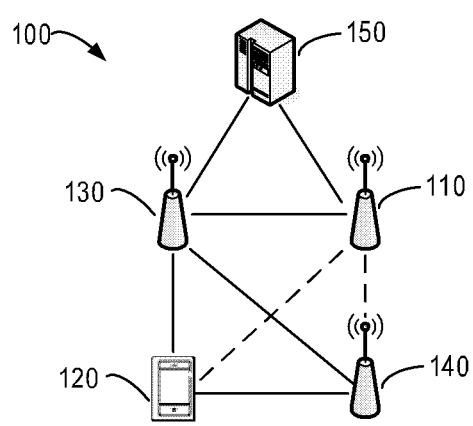
FIG. 1 shows an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an ng-eNB, an en-gNB, a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As mentioned above, during the Inter-Master Node handover, part of split radio bearers terminated in the en-gNB may be kept. If the target eNB decides not to keep a radio bearer as a split radio bearer terminated in the en-gNB but as an MCG bearer terminated in the target eNB, the target eNB may perform a bearer type change from the split radio bearer terminated in the en-gNB with or without data forwarding during the handover procedure. In this case, the target eNB will need transmission statuses of data associated with the bearer that subject to the bearer type change.

Now, the problem is that the source eNB has no possibility to know whether the target eNB has decided to keep all or part of split radio bearers terminated in the en-gNB. The source eNB can only be sure that at least one of the split radio bearers is kept from UE Context Kept Indicator in a Handover Request Acknowledge message.

If the target eNB keeps all split radio bearers terminated in the en-gNB, the en-gNB may not send an SN Status Transfer message to the source eNB and this is an expected behaviour. Hence, the source eNB should proceed without waiting for the SN Status Transfer message. On the other hand, if the target eNB keeps part of split radio bearers terminated in the en-gNB, the SN Status Transfer message from the en-gNB is needed and the source eNB shall wait and forward it to the target eNB.

Since the source eNB does not know which option was chosen by the target eNB, the source eNB does not know whether failure of receiving the SN Status Transfer message from the en-gNB is an error case or not.

Conventionally, the only way to handle this problem is to apply two-step approach. In the first step, the handover is accepted as it is without any reconfiguration of the split radio bearers terminated in the en-gNB. In the second step, once the handover is completed, the target eNB initializes a modification procedure to perform a bearer type change from the split radio bearer terminated in the en-gNB to an MCG bearer. This approach is all right as long as it is the target decision. In case the en-gNB decides to reject some bearers in the Addition Response message, there is no way for the target eNB to keep the dual connectivity context. Thus, the en-gNB has to be released.

In order to at least in part solve above and other potential problems, example embodiments of the present disclosure provide a solution for handover. In the solution, the target eNB or the en-gNB transmits to the source eNB an indication that a type of a radio bearer for a terminal device is to be changed from a split bearer terminated in the en-gNB to an MCG terminated in the target eNB. Upon reception of the indication, the source eNB knows that it needs to wait for a transmission status of data associated with the radio bearer from the en-gNB and forward the transmission status to the target eNB. Alternatively, the target eNB may obtain the transmission status of data associated with the radio bearer from the en-gNB. In this way, a successful handover may be ensured.

FIG. 1 shows an example communication network 100 in which embodiments of the present disclosure can be implemented. The communication network 100 includes a first device 110, a second device 120, a third device 130, a fourth device 140 and a fifth device. In this example, the second device 120 is illustrated as a terminal device, the first device 110, the third device 130 and the fourth device 140 are illustrated as network devices, and the fifth device 150 is illustrated as a Mobility Management Entity (MME). In some embodiments, the first device 110 and the third device 130 may be implemented as eNB, and the fourth device 140 may be implemented as en-gNB. It is to be understood that the number of the first device, the second device, the third device, the fourth device and the fifth device 150 is given for the purpose of illustration without suggesting any limitations to the present disclosure. The communication network 100 may include any suitable number of first, second, third, fourth and fifth devices adapted for implementing implementations of the present disclosure.

The network 100 may be configured to support EN-DC. In EN-DC, the second device 120 may be connected to the first device 110 or the third device 130 that acts as a master node and to the fourth device 140 that acts as a secondary node. The first device 110 or the third device 130 may be connected to the fifth device 150 via an S1 interface. The fourth device 140 may be connected to the first device 110 or the third device 130 via an X2 interface.

Each of the first device 110 and the third device 130 may provide E-UTRA user plane and control plane protocol terminations towards the second device 120. A group of serving cells associated with the first device 110 or the third device 130 is referred to as Master Cell Group (MCG). The first device 110 may establish at least one MCG bearer terminated in the first device 110 for the second device 120. The MCG bearer terminated in the first device 110 refers to a radio bearer with a Radio Link Control (RLC) bearer for which Packet Data Convergence Protocol (PDCP) is located in the first device 110.

The fourth device 140 may provide NR user plane and control plane protocol terminations towards the second device 120. A group of serving cells associated with the fourth device 140 is referred to as Secondary Cell Group (SCG). The first device 110 may establish at least one split bearer terminated in the fourth device 140 for the second device 120. The split bearer terminated in the fourth device 140 refers to a radio bearer with RLC bearers both in MCG and SCG and terminated in the fourth device 140.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

According to embodiments of the present disclosure, the first device 110 or the fourth device 140 transmits to the third device 130 an indication that a type of a radio bearer for the second device 120 is to be changed from a split bearer terminated in the fourth device 140 to an MCG terminated in the first device 110. Upon reception of the indication, the third device 130 knows that it needs to wait for a transmission status of data associated with the radio bearer from the fourth device 140 and forward the transmission status to the first device 110. Alternatively, the first device 110 may obtain the transmission status of data associated with the radio bearer from the fourth device 140. In this way, a successful handover may be ensured.

Figure 2:
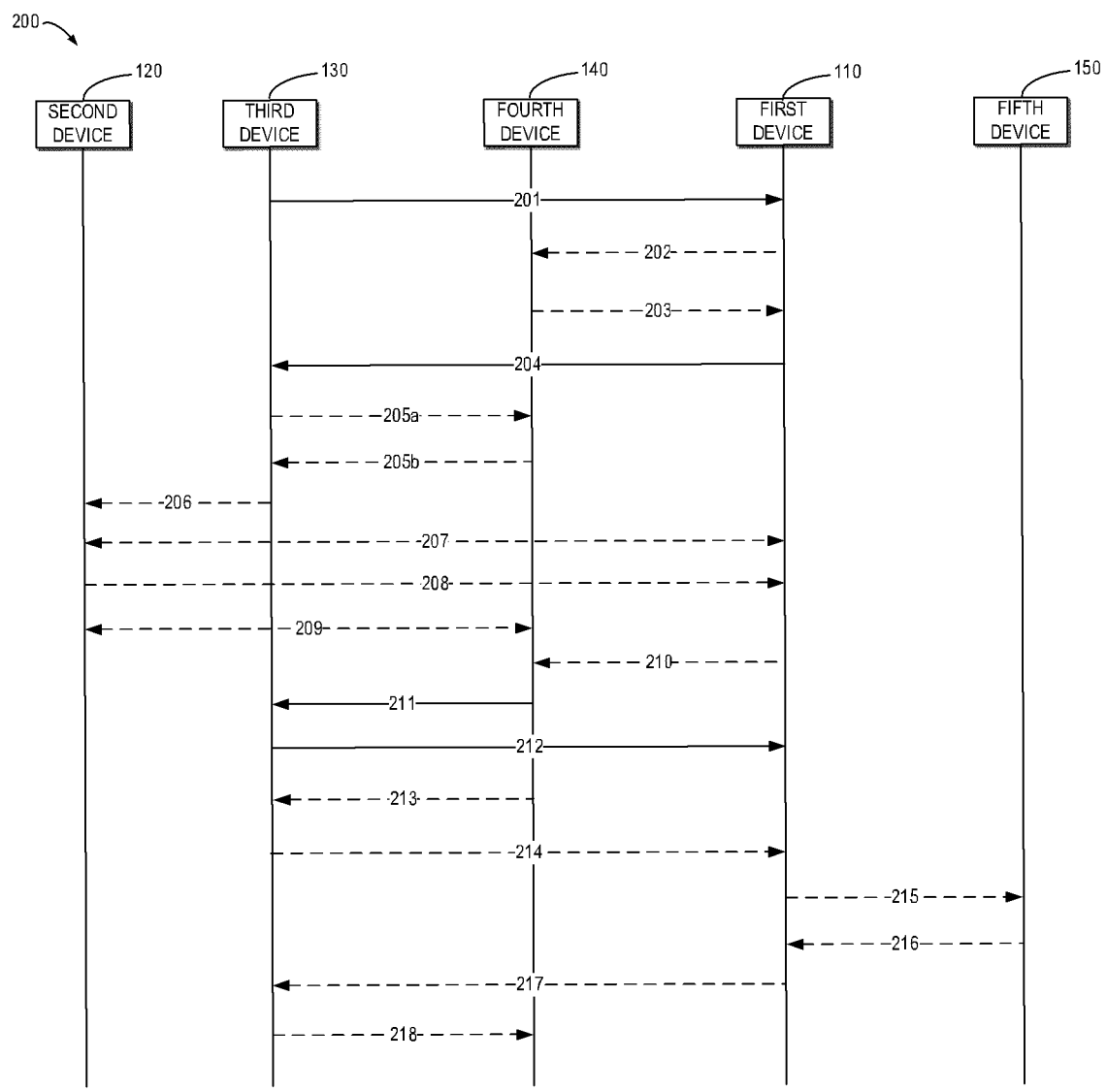
FIG. 2 shows a signaling chart illustrating a process for handover according to some example embodiments of the present disclosure.

Principle and implementations of the present disclosure will be described in detail below with reference to FIGS. 2 to 9. FIG. 2 shows a signaling chart illustrating a process 200 for handover according to some example embodiments of the present disclosure. For the purpose of discussion, the process 200 will be described with reference to FIG. 1. The process 200 may at least involve the first device 110, the second device 120, the third device 130 and the fourth device 140 as illustrated in FIG. 1. It would be appreciated that although the process 200 has been described in the communication system 100 of FIG. 1, this process may be likewise applied to other communication scenarios.

Generally, the process 200 may be used for transferring context data of the second device 120 from the first device 110 to the third device 130 while the context at the fourth device 140 is kept. With the process 200, the first device 110 transmits to the third device 130 an indication that a radio bearer for the second device 120 is to be changed from a split bearer terminated in the fourth device 140 to a MCG bearer terminated in the first device 110. Then, the first device 110 may obtain from the third device 130 a transmission status of data associated with a radio bearer that is to be changed from a split bearer terminated in the fourth device 140 to a MCG bearer terminated in the first device 110.

As shown in FIG. 2, the third device 130 transmits 201 to the first device 110 a request for handover of the second device 120 from the third device 130 to the first device 110. In some example embodiments, the request may comprise at least one of the following: SgNB UE X2AP ID and SgNB ID. The SgNB UE X2AP ID may uniquely identify a terminal device over an X2 interface within the fourth device 140. In addition, the SgNB UE X2AP ID defines a context reference for the second device 120.

In some example embodiments, upon receiving the request for handover, the first device 110 may determine split bearers terminated in the fourth device 140 based on the context for the second device 120. In turn, the first device 110 may determine to keep part of the split bearers and change one or more of the split bearers to MCG bearer(s) terminated in the first device 110. For the purpose of discussion, an example in which one of the split bearers is changed to a MCG bearer terminated in the first device 110 will be described. It should be understood that the process 200 may be likewise applied to scenarios where more than one of the split bearers is changed to MCG bearers terminated in the first device 110.

Optionally, in some example embodiments, the first device 110 may coordinate with the fourth device 140 to determine which split bearer(s) will be subject to a bearer type change. In such example embodiments, the first device 110 may transmit 202 an SgNB Addition Request message to the fourth device 140. The SgNB Addition Request message may include SN UE X2AP ID as a reference to the context for the second device 120 in the fourth device 140 that was established by the third device 130. In addition to the SN UE X2AP ID, the SgNB Addition Request message may also comprise an E-RABs To Be Added List. The E-RABs To Be Added List may include identifiers of one or more radio bearers that are requested to be kept by the first device 110 as the split bearers terminated in the fourth device 140.

Upon reception of the SgNB Addition Request message, the fourth device 140 may determine which radio bearer(s) in the E-RABs To Be Added List will be admitted to be added, i.e., which radio bearer(s) in the E-RABs To Be Added List will be kept by the first device 110 as the split bearers. In turn, the fourth device 140 may transmit 203 an SgNB Addition Request Acknowledge message to the first device 110. The SgNB Addition Request Acknowledge message may include an E-RABs Admitted To Be Added List. The E-RABs Admitted To Be Added List may include identifiers of one or more radio bearers that are admitted to be kept by the first device 110 as the split bearers terminated in the fourth device 140.

Upon reception of the SgNB Addition Request Acknowledge message, the first device 110 may determine one or more radio bearers that are admitted to be kept as the split bearers terminated in the fourth device 140 based on the E-RABs Admitted To Be Added List. Based on the context for the second device 120 and the one or more radio bearers that are admitted to be kept as the split bearers, the first device 110 may determine one or more split bearers that will subject to a bearer type change.

The first device 110 transmit 204 to the third device 130 an indication that a type of a radio bearer for the second device 120 is to be changed from a split bearer terminated in the fourth device 140 to an MCG bearer terminated in the first device 110. In the following, the indication that a type of a radio bearer for the second device 120 is to be changed from a split bearer terminated in a fourth device 140 to an MCG bearer terminated in the first device 110 is referred to as a bearer type change indication.

In example embodiments where more than one of the split bearers for the second device 120 is to be changed to MCG bearers terminated in the first device 110, the bearer type change indication may include an indicator for each of the split bearers. For example, if an indicator for a split bearer terminated in a fourth device 140 is set to be "true", it may indicates that the split bearer is to be changed to MCG bearers terminated in the first device 110.

In some example embodiments, the first device 110 may include the bearer type change indication in a Handover Request Acknowledge message and transmit the Handover Request Acknowledge message comprising the indication to the third device 130. Upon receiving the bearer type change indication In some example embodiments, the first device 110 may also include a UE context kept indicator in the Handover Request Acknowledge message. The UE context kept indicator which is set to be "true" may indicate that the first device 110 keeps at least one of the split bearers.

Alternatively, in other example embodiments, the first device 110 may include the UE context kept indicator in other messages than the Handover Request Acknowledge message. In other words, the first device 110 may transmit the UE context kept indicator separately from the bearer type change indication.

Optionally, in some example embodiments, upon reception of the bearer type change indication, the third device 130 may transmit 205*a* an SgNB Release Request message to the fourth device 140 including a Cause indicating MCG mobility. The fourth device 140 transmit 205*b* an SgNB Release Request Acknowledge message to the third device 130 to acknowledge the release request.

The third device 130 transmits 206 an RRC connection reconfiguration message to the second device 120 so as to trigger the second device 120 to apply the new configuration. The second device 120 performs 207 a random access procedure so as to synchronize to the first device 110. Upon the random access procedure, the second device 120 replies 208 with RRC Connection Reconfiguration Complete message to the first device 110. If configured with bearers requiring SCG radio resources, the second device 120 performs 209 a random access procedure so as to synchronize to fourth device 140. If the RRC connection reconfiguration procedure was successful, the first device 110 informs 210 the fourth device 140 via an SgNB Reconfiguration Complete message.

The fourth device 140 transmits 211 to the third device 130 a transmission status of data associated with the radio bearer that is to be changed from the split bearer terminated in the fourth device 140 to an MCG bearer terminated in the first device 110.

In some example embodiments, the fourth device 140 may include the transmission status of data associated with the radio bearer in an SN Status Transfer message and transmit the SN status transfer message to the third device 130.

In some example embodiments, the transmission status comprises at least one of the following: an uplink packet data convergence protocol sequence number for the data, a hyper frame number receiver status for the data, a downlink packet data convergence protocol sequence number for the data, or a hyper frame number transmitter status for the data.

Upon reception of the transmission status of data associated with the radio bearer, the third device 130 transmits 212 the transmission status of data associated with the radio bearer to the first device 110. In some example embodiments, the third device 130 may include the transmission status of data associated with the radio bearer in an SN Status Transfer message and transmit the message to the first device 110.

In some example embodiments, the third device 130 may transmit the transmission status of data associated with the radio bearer together with a transmission status of data associated with one or more MCG radio bearers terminated in the third device 130. For example, the third device 130 may include in the SN Status Transfer message the transmission status of data associated with the radio bearer together with the transmission status of data associated with the one or more MCG radio bearers. In turn, the third device 130 transmits the SN Status Transfer message to the first device 110.

Optionally, the fourth device 140 may transmit 213 the data associated with the radio bearer to the third device 130. The third device 130 forwards 214 the data associated with the radio bearer to the first device 110.

It should be understood that although the act 213 is shown to be subsequent to the act 211, the act 213 may be performed in parallel to the act 211 or prior to the act 211. Similarly, the act 214 may be performed in parallel to the act 212 or prior to the act 212.

Optionally, in some example embodiments, the first device 110 transmits 215 a Path Switch Request to the fifth device 150 to initiate the S1 Path Switch procedure. The fifth device 150 replies 216 a Path Switch Request acknowledge message to the first device 110. In turn, the first device 110 transmits 217 a UE context release message to the third device 130 to initiate the UE Context Release procedure towards the third device 130. The third device 130 transmits 218 the UE context release message to the fourth device 140. Upon reception of the UE Context Release message, the fourth device 140 can release C-plane related resource associated to the context for the second device 120 towards the third device 130.

Figure 3:
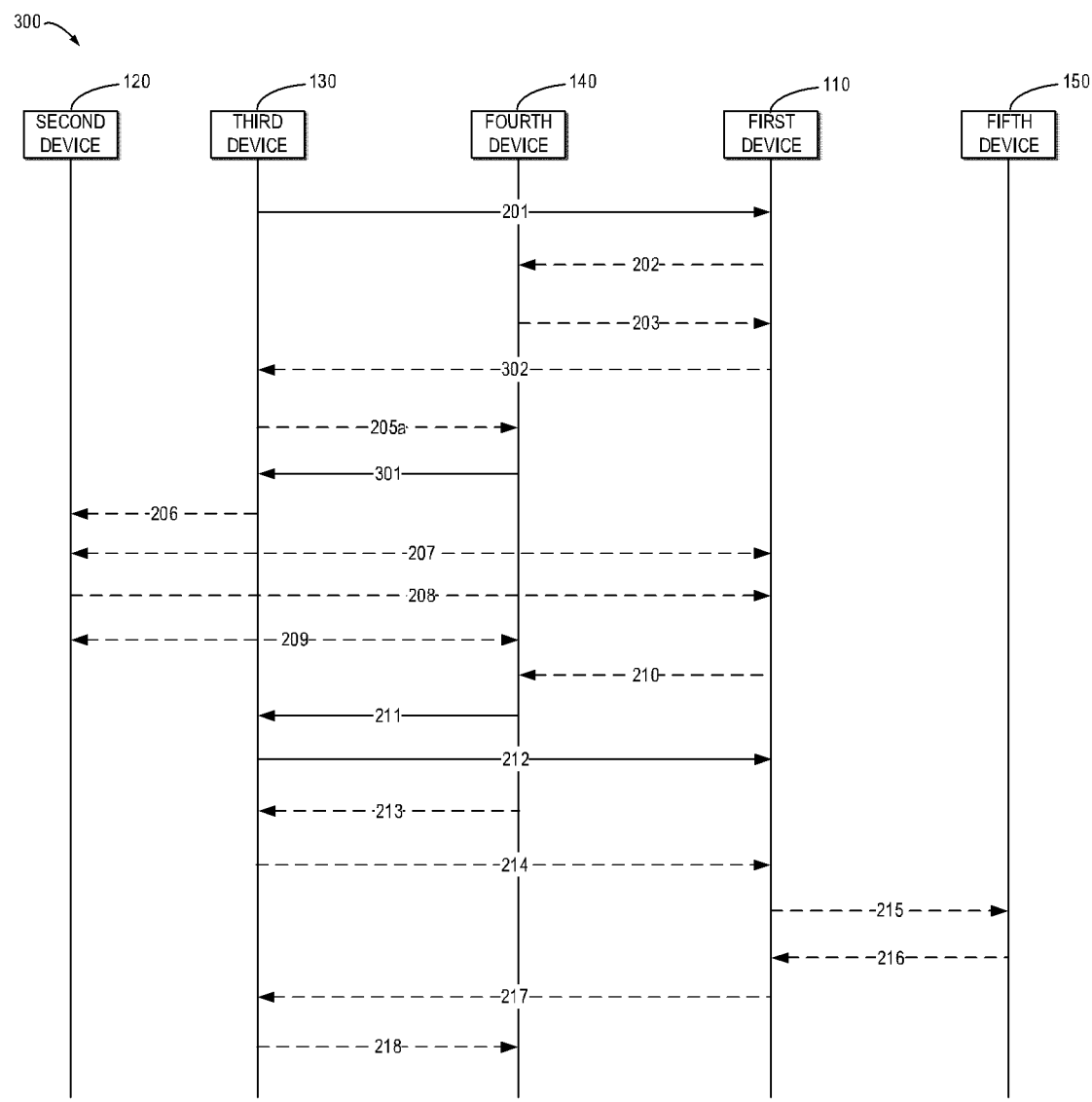
FIG. 3 shows a signaling chart illustrating a process for handover according to some other example embodiments of the present disclosure.

FIG. 3 shows a signaling chart illustrating a process 300 for handover according to some example embodiments of the present disclosure. For the purpose of discussion, the process 300 will be described with reference to FIG. 1. The process 300 may at least involve the first device 110, the second device 120, the third device 130 and the fourth device 140 as illustrated in FIG. 1. It would be appreciated that although the process 300 has been described in the communication system 100 of FIG. 1, this process may be likewise applied to other communication scenarios.

Generally, similar to the process 200, the process 300 may be used for transferring context data of the second device 120 from the first device 110 to the third device 130 while the context at the fourth device 140 is kept. The process 300 is different from the process 200 in that it is not the first device 110 but the fourth device 140 that transmits 301 to the third device 130 an indication that a radio bearer for the second device 120 is to be changed from a split bearer terminated in the fourth device 140 to a MCG bearer terminated in the first device 110. In some embodiments, the fourth device 140 includes the indication in an SgNB Release Request Acknowledge message and transmits the message to the third device 130. Accordingly, the third device 130 receives from the fourth device 140 the indication that the radio bearer is to be changed from the split bearer to the MCG bearer terminated in the first device 110.

Thus, the process 300 is also different from the process 200 in that, in response to reception 201 of the Handover Request message from the third device 130, the first device 110 transmits 302 a Handover Request Acknowledge message without the indication that the radio bearer is to be changed from the split bearer to the MCG bearer.

Upon reception of the transmission status of data associated with the radio bearer, the third device 130 transmits 212 to the first device 110 the transmission status of data associated with the radio bearer. In some example embodiments, the third device 130 may include the transmission status of data associated with the radio bearer in an SN Status Transfer message and transmit the message to the first device 110.

In this way, the first device 110 may obtain from the third device 130 the transmission status of data associated with the radio bearer.

Figure 4:
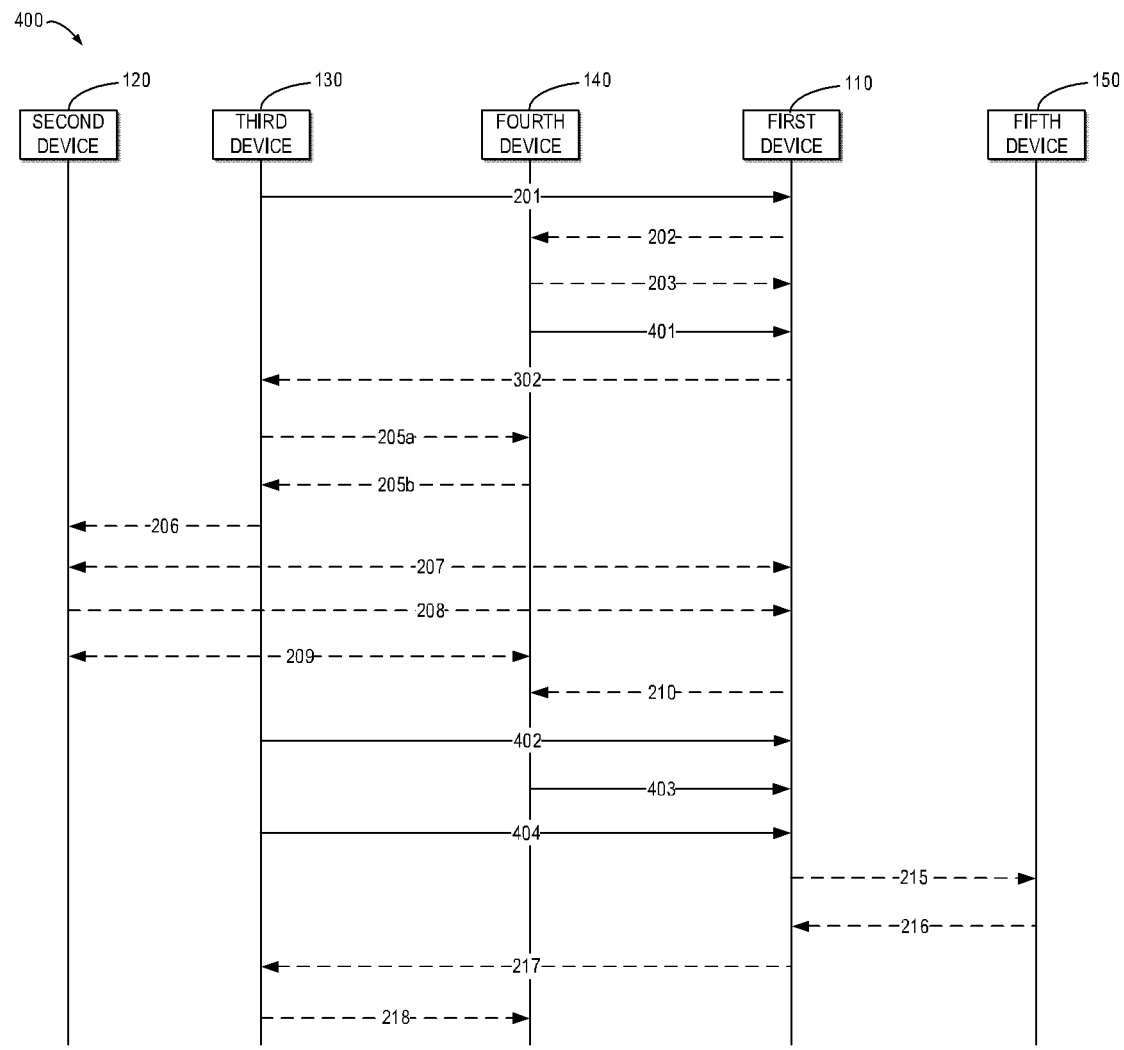
FIG. 4 shows a signaling chart illustrating a process for handover according to still other example embodiments of the present disclosure.

FIG. 4 shows a signaling chart illustrating a process 400 for handover according to some example embodiments of the present disclosure. For the purpose of discussion, the process 400 will be described with reference to FIG. 1. The process 400 may at least involve the first device 110, the second device 120, the third device 130 and the fourth device 140 as illustrated in FIG. 1. It would be appreciated that although the process 400 has been described in the communication system 100 of FIG. 1, this process may be likewise applied to other communication scenarios.

Generally, similar to the processes 200 and 300, the process 400 may be used for transferring context data of the second device 120 from the first device 110 to the third device 130 while the context at the fourth device 140 is kept. The process 400 is different from the processes 200 and 300 in that the first device 110 may obtain from the fourth device 140 a transmission status of data associated with a radio bearer that is to be changed from a split bearer terminated in the fourth device 140 to a MCG bearer terminated in the first device 110. Similar to the process 300, in the process 400, in response to reception 201 of the Handover Request message from the third device 130, the first device 110 transmits 302 the Handover Request Acknowledge message without the indication that the radio bearer is to be changed from the split bearer to the MCG bearer.

In the process 400, the first device 110 coordinates a radio bearer for the second device 120 with the fourth device 140. The radio bearer is to be changed from a split bearer terminated in the fourth device 140 to a MCG bearer terminated in the first device 110.

In some example embodiments, the first device 110 may coordinate the radio bearer with the fourth device 140 to determine the radio bearer by performing the acts 202 and 203 in FIG. 2. Thus, details of the acts 202 and 203 are omitted for the purpose of conciseness.

The first device 110 receives 401 from the fourth device 140 a transmission status of data associated with the radio bearer that is to be changed from a split bearer terminated in the fourth device 140 to a MCG bearer terminated in the first device 110. In addition, the first device 110 receives 402 from the third device 130 a transmission status of data associated with one or more MCG radio bearers terminated in the third device 130.

For the purpose of forwarding the data associated with the radio bearer from the fourth device 140, the first device 110 transmits to the fourth device 140 information concerning tunnel endpoints in the first device 110 for the radio bearer.

In some example embodiments, the information concerning tunnel endpoints in the first device 110 may include identifiers of the tunnel endpoints. In such example embodiments, the first device 110 may include the identifiers of the tunnel endpoints in the SgNB Addition Request message in the act 202, and transmit the SgNB Addition Request message to the fourth device 140.

In other example embodiments, the first device 110 may include the identifiers of the tunnel endpoints in other messages than the SgNB Addition Request message. In such example embodiments, the first device 110 may transmit the other messages subsequent to or in parallel to the reception of the transmission status of data associated with the radio bearer.

The first device 110 receives 403 the data associated with the radio bearer from the fourth device 140 via the tunnel endpoints. It should be understood that although the act 403 is shown to be subsequent to the act 401, the act 403 may be performed in parallel to the act 401 or prior to the act 401.

In addition, the first device 110 receives 404 from the third device 130 the data associated with one or more MCG radio bearers terminated in the third device 130.

Figure 5:
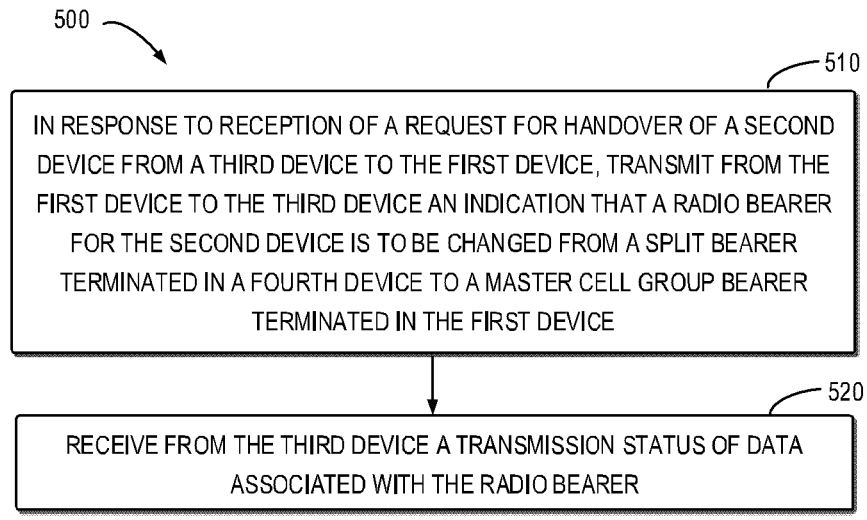
FIG. 5 shows a flowchart of a method implemented at a device in accordance with some example embodiments of the present disclosure.

FIG. 5 shows a flowchart of an example method 500 implemented at a device in accordance with some example embodiments of the present disclosure. For the purpose of discussion, the method 500 will be described from the perspective of the first device 110 with reference to FIG. 1. It would be appreciated that the method 500 may also be implemented at the second device 120, the third device 130 or the fourth device 140 in FIG. 1.

At block 510, in response to reception of a request for handover of a second device from a third device to the first device, the first device 110 transmits to the third device an indication that a radio bearer for the second device is to be changed from a split bearer terminated in a fourth device to a MCG bearer terminated in the first device. The second device is in dual connectivity with the third and fourth devices.

At block 520, the first device 110 receives from the third device a transmission status of data associated with the radio bearer.

In some example embodiments, the first device 110 receives the data from the third device based on the transmission status.

In some example embodiments, the first device 110 transmits to the third device the indication by transmitting a Handover Request Acknowledge message comprising the indication.

In some example embodiments, the transmission status comprises at least one of the following: an uplink packet data convergence protocol sequence number for the data, a hyper frame number receiver status for the data, a downlink packet data convergence protocol sequence number for the data, or a hyper frame number transmitter status for the data.

In some example embodiments, the first and third devices are evolved NodeBs, the second device is a terminal device, and the fourth device is a EUTRA-NR Next Generation NodeB.

Figure 6:
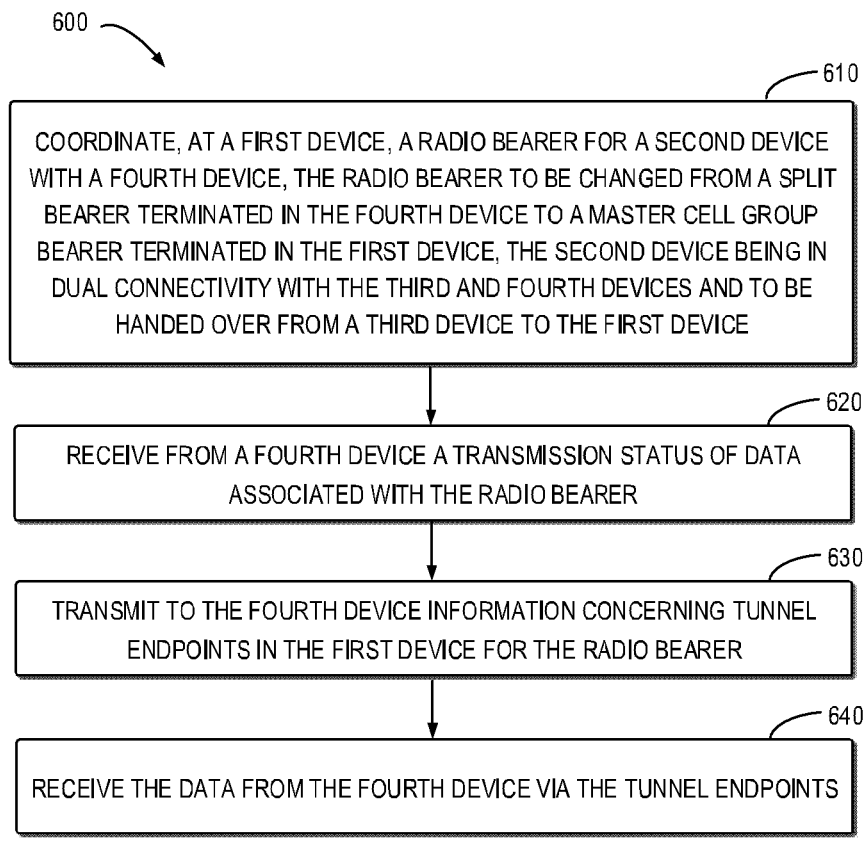
FIG. 6 shows a flowchart of a method implemented at a device in accordance with some example embodiments of the present disclosure.

FIG. 6 shows a flowchart of an example method 600 implemented at a device in accordance with some example embodiments of the present disclosure. For the purpose of discussion, the method 600 will be described from the perspective of the first device 110 with reference to FIG. 1. It would be appreciated that the method 600 may also be implemented at the second device 120, the third device 130 or the fourth device 140 in FIG. 1.

At block 610, the first device 110 coordinates a radio bearer for a second device with a fourth device, the radio bearer to be changed from a split bearer terminated in the fourth device to a MCG bearer terminated in the first device. The second device is in dual connectivity with the third and fourth devices and is to be handed over from a third device to the first device.

At block 620, the first device 110 receives from a fourth device a transmission status of data associated with the radio bearer.

At block 630, the first device 110 transmits to the fourth device information concerning tunnel endpoints in the first device for the radio bearer At block 640, the first device 110 receives the data from the fourth device via the tunnel endpoints In some example embodiments, the transmission status comprises at least one of the following: an uplink packet data convergence protocol sequence number for the data, a hyper frame number receiver status for the data, a downlink packet data convergence protocol sequence number for the data, or a hyper frame number transmitter status for the data.

In some example embodiments, the first device 110 transmits to the fourth device information concerning the tunnel endpoints by transmitting an SgNB Addition Request message to the fourth device, the Request message comprising identifiers of the tunnel endpoints.

In some example embodiments, the first and third devices are evolved NodeBs, the second device is a terminal device, and the fourth device is a EUTRA-NR Next Generation NodeB.

Figure 7:
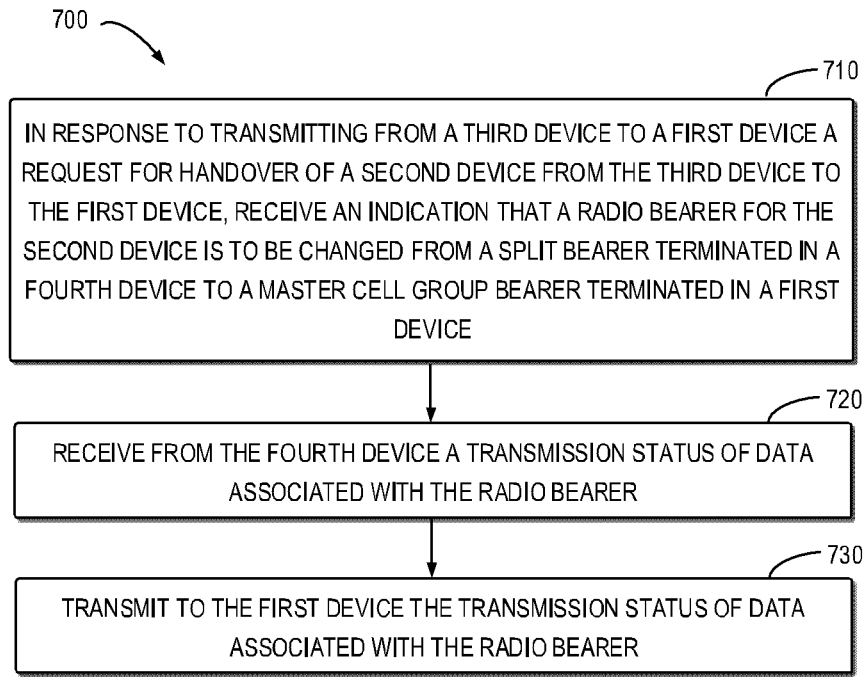
FIG. 7 shows a flowchart of a method implemented at a device in accordance with some example embodiments of the present disclosure.

FIG. 7 shows a flowchart of an example method 700 implemented at a device in accordance with some example embodiments of the present disclosure. For the purpose of discussion, the method 700 will be described from the perspective of the third device 130 with reference to FIG. 1. It would be appreciated that the method 700 may also be implemented at the first device 110, the second device 120 or the fourth device 140 in FIG. 1.

At block 710, in response to transmitting from a third device to a first device a request for handover of a second device from the third device to the first device, the third device 130 receives an indication that a radio bearer for the second device is to be changed from a split bearer terminated in a fourth device to a MCG bearer terminated in a first device. The second device is in dual connectivity with the third and fourth devices.

At block 720, the third device 130 receives from the fourth device a transmission status of data associated with the radio bearer.

At block 730, the third device 130 transmits to the first device the transmission status of data associated with the radio bearer.

In some example embodiments, the third device 130 transmits the data to the first device based on the transmission status.

In some example embodiments, the third device 130 receives the indication by one of the following: receiving from the first device a Handover Request Acknowledge message comprising the indication, or receiving from the fourth device an SgNB Release Request Acknowledge message comprising the indication.

In some example embodiments, the transmission status comprises at least one of the following: an uplink packet data convergence protocol sequence number for the data, a hyper frame number receiver status for the data, a downlink packet data convergence protocol sequence number for the data, or a hyper frame number transmitter status for the data.

In some example embodiments, the first and third devices are evolved NodeBs, the second device is a terminal device, and the fourth device is a EUTRA-NR Next Generation NodeB.

Figure 8:
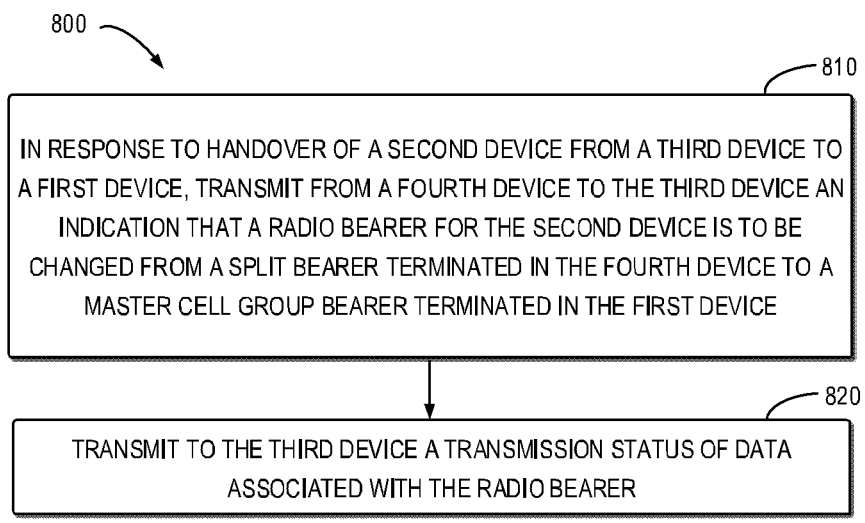
FIG. 8 shows a flowchart of a method implemented at a device in accordance with some example embodiments of the present disclosure.

FIG. 8 shows a flowchart of an example method 800 implemented at a device in accordance with some example embodiments of the present disclosure. For the purpose of discussion, the method 800 will be described from the perspective of the fourth device 140 with reference to FIG. 1. It would be appreciated that the method 800 may also be implemented at the first device 110, the second device 120 or the third device 130 in FIG. 1.

At block 810, in response to handover of a second device from a third device to a first device, the fourth device 140 transmits from a fourth device to the third device an indication that a radio bearer for the second device is to be changed from a split bearer terminated in the fourth device to a MCG bearer terminated in the first device. The second device is in dual connectivity with the third and fourth devices.

At block 820, the fourth device 140 transmits to the third device a transmission status of data associated with the radio bearer.

In some example embodiments, the fourth device 140 transmits the data to the third device based on the transmission status.

In some example embodiments, the fourth device 140 transmits to the third device the indication by transmitting an SgNB Release Request Acknowledge message comprising the indication.

In some example embodiments, the transmission status comprises at least one of the following: an uplink packet data convergence protocol sequence number for the data, a hyper frame number receiver status for the data, a downlink packet data convergence protocol sequence number for the data, or a hyper frame number transmitter status for the data.

In some example embodiments, the first and third devices are evolved NodeBs, the second device is a terminal device, and the fourth device is a EUTRA-NR Next Generation NodeB.

Figure 9:
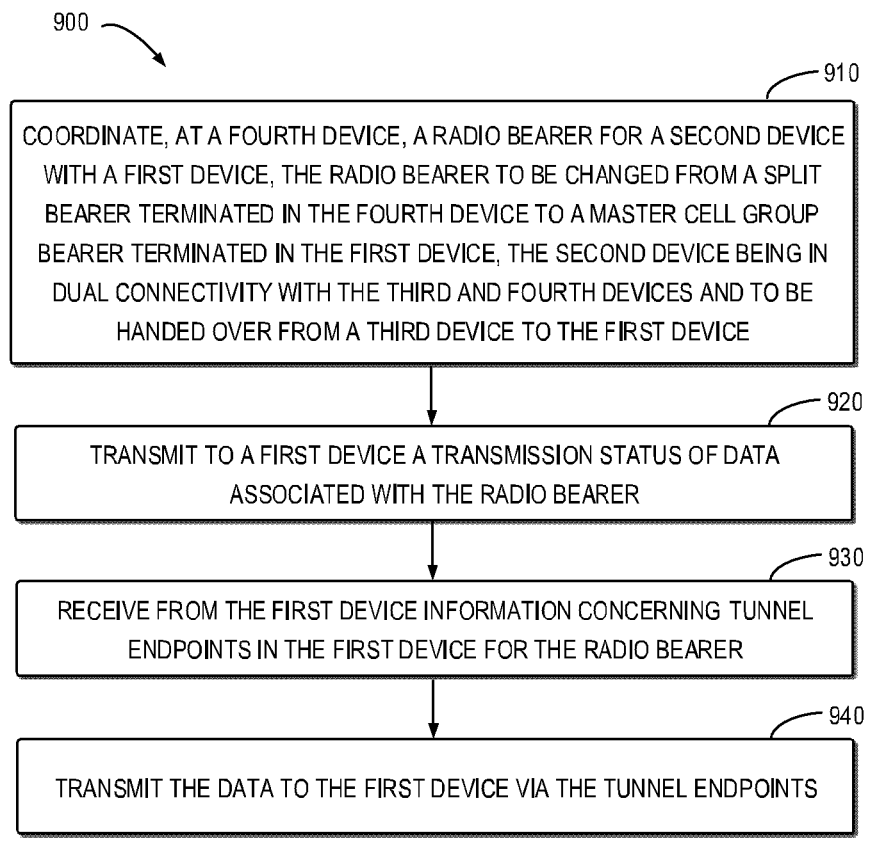
FIG. 9 shows a flowchart of a method implemented at a device in accordance with some example embodiments of the present disclosure.

FIG. 9 shows a flowchart of an example method 900 implemented at a device in accordance with some example embodiments of the present disclosure. For the purpose of discussion, the method 900 will be described from the perspective of the fourth device 140 with reference to FIG. 1. It would be appreciated that the method 900 may also be implemented at the first device 110, the second device 120 or the third device 130 in FIG. 1.

At block 910, the fourth device 140 coordinates a radio bearer for a second device with a first device, the radio bearer to be changed from a split bearer terminated in the fourth device to a MCG bearer terminated in the first device.

The second device is in dual connectivity with the third and fourth devices and to be handed over from a third device to the first device.

At block 920, the fourth device 140 transmits to a first device a transmission status of data associated with the radio bearer.

At block 930, the fourth device 140 receives from the first device information concerning tunnel endpoints in the first device for the radio bearer.

At block 940, the fourth device 140 transmits the data to the first device via the tunnel endpoints.

It should be understood that although the block 920 of transmitting the transmission status of data is shown prior to the block 930 of receiving the information concerning tunnel endpoints, the block 920 may be performed in parallel to the block 930 or subsequent to the block 930.

In some example embodiments, the fourth device 140 receives the information concerning the tunnel endpoints by receiving an SgNB Addition Request message from the first device, the Request message comprising identifiers of the tunnel endpoints.

In some example embodiments, the transmission status comprises at least one of the following: an uplink packet data convergence protocol sequence number for the data, a hyper frame number receiver status for the data, a downlink packet data convergence protocol sequence number for the data, or a hyper frame number transmitter status for the data.

In some example embodiments, the first and third devices are evolved NodeBs, the second device is a terminal device, and the fourth device is a EUTRA-NR Next Generation NodeB.

In some example embodiments, an apparatus capable of performing any of the method 500 (for example, the first device 110) may comprise means for performing the respective steps of the method 500. The means may be implemented in any suitable form. For example, the means may be implemented in a circuitry or software module.

In some example embodiments, the apparatus comprises means for in response to reception of a request for handover of a second device from a third device to a first device, transmitting to the third device an indication that a radio bearer for the second device is to be changed from a split bearer terminated in a fourth device to a Master Cell Group bearer terminated in the first device, the second device being in dual connectivity with the third and fourth devices; means for receiving from the third device a transmission status of data associated with the radio bearer.

In some example embodiments, the first device 110 transmits to the third device the indication by transmitting a Handover Request Acknowledge message comprising the indication.

In some example embodiments, the transmission status comprises at least one of the following: an uplink packet data convergence protocol sequence number for the data, a hyper frame number receiver status for the data, a downlink packet data convergence protocol sequence number for the data, or a hyper frame number transmitter status for the data.

In some example embodiments, the first and third devices are evolved NodeBs, the second device is a terminal device, and the fourth device is a EUTRA-NR Next Generation NodeB.

In some example embodiments, an apparatus capable of performing any of the method 600 (for example, the first device 110) may comprise means for performing the respective steps of the method 600. The means may be implemented in any suitable form. For example, the means may be implemented in a circuitry or software module.

In some example embodiments, the apparatus comprises means for coordinating, at a first device, a radio bearer for a second device with a fourth device, the radio bearer to be changed from a split bearer terminated in the fourth device to a Master Cell Group bearer terminated in the first device, the second device being in dual connectivity with the third and fourth devices and to be handed over from a third device to the first device; means for receiving from a fourth device a transmission status of data associated with the radio bearer; means for transmitting to the fourth device information concerning tunnel endpoints in the first device for the radio bearer; and means for receiving the data from the fourth device via the tunnel endpoints.

In some example embodiments, the transmission status comprises at least one of the following: an uplink packet data convergence protocol sequence number for the data, a hyper frame number receiver status for the data, a downlink packet data convergence protocol sequence number for the data, or a hyper frame number transmitter status for the data.

In some example embodiments, the first device 110 transmits to the fourth device information concerning the tunnel endpoints by transmitting an SgNB Addition Request message to the fourth device, the Request message comprising identifiers of the tunnel endpoints.

In some example embodiments, the first and third devices are evolved NodeBs, the second device is a terminal device, and the fourth device is a EUTRA-NR Next Generation NodeB.

In some example embodiments, an apparatus capable of performing any of the method 700 (for example, the third device 130) may comprise means for performing the respective steps of the method 700. The means may be implemented in any suitable form. For example, the means may be implemented in a circuitry or software module.

In some example embodiments, the apparatus comprises means for in response to transmitting from the third device to a first device a request for handover of a second device from the third device to the first device, receiving an indication that a radio bearer for the second device is to be changed from a split bearer terminated in a fourth device to a Master Cell Group bearer terminated in a first device, the second device being in dual connectivity with the third and fourth devices; means for receiving from the fourth device a transmission status of data associated with the radio bearer; means for transmitting to the first device the transmission status of data associated with the radio bearer.

In some example embodiments, the third device 130 receives the indication by one of the following: receiving from the first device a Handover Request Acknowledge message comprising the indication, or receiving from the fourth device an SgNB Release Request Acknowledge message comprising the indication.

In some example embodiments, the transmission status comprises at least one of the following: an uplink packet data convergence protocol sequence number for the data, a hyper frame number receiver status for the data, a downlink packet data convergence protocol sequence number for the data, or a hyper frame number transmitter status for the data.

In some example embodiments, the first and third devices are evolved NodeBs, the second device is a terminal device, and the fourth device is a EUTRA-NR Next Generation NodeB.

In some example embodiments, an apparatus capable of performing any of the method 800 (for example, the fourth device 140) may comprise means for performing the respective steps of the method 800. The means may be implemented in any suitable form. For example, the means may be implemented in a circuitry or software module.

In some example embodiments, the apparatus comprises means for in response to handover of a second device from a third device to a first device, transmitting from a fourth device to the third device an indication that a radio bearer for the second device is to be changed from a split bearer terminated in the fourth device to a Master Cell Group bearer terminated in the first device, the second device being in dual connectivity with the third and fourth devices; means for transmitting to the third device a transmission status of data associated with the radio bearer.

In some example embodiments, the fourth device 140 transmits to the third device the indication by transmitting an SgNB Release Request Acknowledge message comprising the indication.

In some example embodiments, the transmission status comprises at least one of the following: an uplink packet data convergence protocol sequence number for the data, a hyper frame number receiver status for the data, a downlink packet data convergence protocol sequence number for the data, or a hyper frame number transmitter status for the data.

In some example embodiments, the first and third devices are evolved NodeBs, the second device is a terminal device, and the fourth device is a EUTRA-NR Next Generation NodeB.

In some example embodiments, an apparatus capable of performing any of the method 900 (for example, the fourth device 140) may comprise means for performing the respective steps of the method 900. The means may be implemented in any suitable form. For example, the means may be implemented in a circuitry or software module.

In some example embodiments, the apparatus comprises means for coordinating, at a fourth device, a radio bearer for a second device with a first device, the radio bearer to be changed from a split bearer terminated in the fourth device to a Master Cell Group bearer terminated in the first device, the second device being in dual connectivity with the third and fourth devices and to be handed over from a third device to the first device; means for transmitting to a first device a transmission status of data associated with the radio bearer; means for receiving from the first device information concerning tunnel endpoints in the first device for the radio bearer; and means for transmitting the data to the first device via the tunnel endpoints.

In some example embodiments, the fourth device 140 receives the information concerning the tunnel endpoints by receiving an SgNB Addition Request message from the first device, the Request message comprising identifiers of the tunnel endpoints.

In some example embodiments, the transmission status comprises at least one of the following: an uplink packet data convergence protocol sequence number for the data, a hyper frame number receiver status for the data, a downlink packet data convergence protocol sequence number for the data, or a hyper frame number transmitter status for the data.

In some example embodiments, the first and third devices are evolved NodeBs, the second device is a terminal device, and the fourth device is a EUTRA-NR Next Generation NodeB.

It shall be appreciated that descriptions of features with reference to FIGS. 1 to 4 also apply to the methods 500, 600, 700, 800 and 900, and have the same effects. Thus, the details of the features are omitted.

Figure 10:
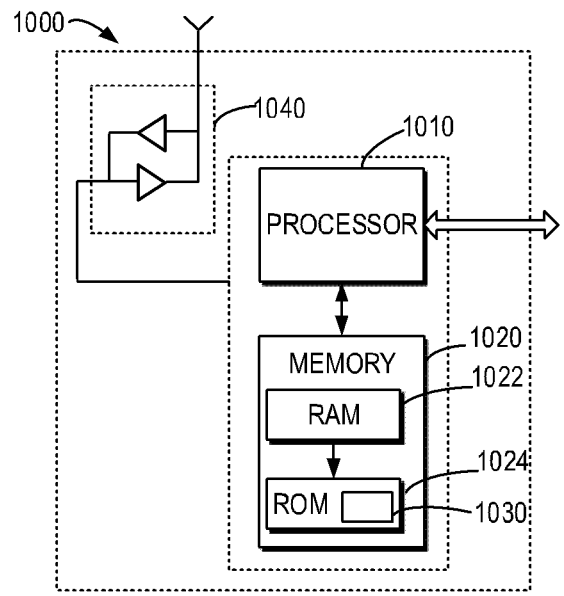
FIG. 10 illustrates a simplified block diagram of an apparatus that is suitable for implementing some other embodiments of the present disclosure.
Figure 11:
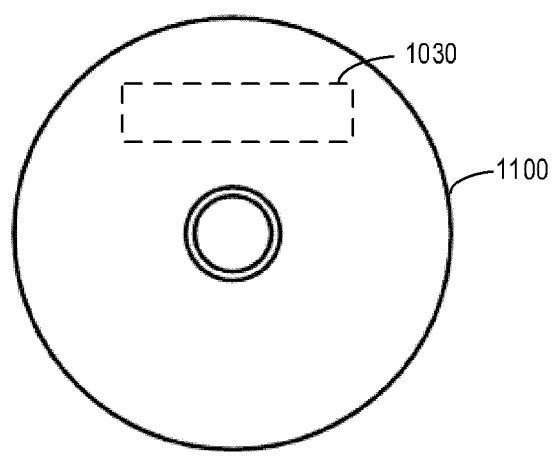
FIG. 11 illustrates a block diagram of an example computer readable medium in accordance with some example embodiments of the present disclosure.

FIG. 10 is a simplified block diagram of a device 1000 that is suitable for implementing embodiments of the present disclosure. The device 1000 may be provided to implement the communication device, for example the first device 110, the second device 120, the third device 130, or the fourth device 140 as shown in FIG. 1. As shown, the device 1000 includes one or more processors 1010, one or more memories 1020 coupled to the processor 1010, and one or more communication modules 1040 coupled to the processor 1010.

The communication module 1040 is for bidirectional communications. The communication module 1040 has at least one antenna to facilitate communication. The communication interface may represent any interface that is necessary for communication with other network elements.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The program 1030 may be stored in the ROM 1024. The processor 1010 may perform any suitable actions and processing by loading the program 1030 into the RAM 1022.

The embodiments of the present disclosure may be implemented by means of the program 1030 so that the device 1000 may perform any process of the disclosure as discussed with reference to FIGS. 2 to 9. The embodiments of the present disclosure may also be implemented by hardware or by a combination of software and hardware.

In some example embodiments, the program 1030 may be tangibly contained in a computer readable medium which may be included in the device 1000 (such as in the memory 1020) or other storage devices that are accessible by the device 1000. The device 1000 may load the program 1030 from the computer readable medium to the RAM 1022 for execution. The computer readable medium may include any types of tangible non-volatile storage, such as ROM, EPROM, a flash memory, a hard disk, CD, DVD, and the like. FIG. 10 shows an example of the computer readable medium 1100 in form of CD or DVD. The computer readable medium has the program 1030 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500, 600, 700, 800 and 900 as described above with reference to FIGS. 5, 6, 7, 8 and 9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A target master node device, comprising:
at least one processor; and
at least one memory storing instructions that when executed by the at least one processor, cause the device to:
receive, by the target master node device from a source master node, a request for inter-master node handover of a terminal device from the source master node to the target master node, wherein the terminal device has a plurality of split radio bearers terminated in a secondary node in dual connectivity comprising a connection to the source master node and to the secondary node;
in response to the reception, determine not to keep at least one radio bearer of the plurality of split radio bearers as a split radio bearer;
transmit, by the target master node, to the source master node an indication that the at least one radio bearer is to be changed from a split radio bearer terminated in the secondary node to a Master Cell Group bearer terminated in the target master node, and
in response to the indication, receive from the source master node or from the secondary node a transmission status of data associated with the at least one radio bearer.

2. The target master node device of claim 1, wherein the at least one memory is storing instructions that when executed by the at least one processor, cause the device to transmit to the third device the indication by:
transmitting a Handover Request Acknowledge message comprising the indication.

3. The target master node device of claim 1, wherein the transmission status comprises at least one of the following:
an uplink packet data convergence protocol sequence number for the data,
a hyper frame number receiver status for the data,
a downlink packet data convergence protocol sequence number for the data, or
a hyper frame number transmitter status for the data.

4. The target master node device of claim 1, wherein the device is one of an evolved NodeBs, a terminal device, or a EUTRA-NR Next Generation NodeB.

5. The target master node device of claim 1, wherein the target master node device is further caused to:
transmit to a terminal device information concerning tunnel endpoints in the target master node device for the radio bearer; and
receive the data from the terminal device via the tunnel endpoints.

6. A source master node device, comprising:
at least one processor; and
at least one memory storing instructions that when executed by the at least one processor, cause the device to:
transmit, by the source master node device to a target master node, a request for inter-master node handover of a terminal device from the source master node to the target master node, wherein the terminal device has a plurality of split radio bearers terminated in a secondary node in dual connectivity comprising a connection to the source master node and to the secondary node;
in response to the transmission, receive an indication that at least one radio bearer of the plurality of split radio bearers is to be changed from a split radio bearer terminated in the secondary node to a Master Cell Group bearer terminated in the target master node;
receive, in association with the receiving of the indication from the secondary node, a transmission status of data associated with the at least one radio bearer; and
transmit to the target master node the transmission status of data associated with the at least one radio bearer.

7. The source master node device, of claim 6, wherein the terminal device is caused the at least one memory storing instructions that when executed by the at least one processor, cause the terminal device to receive the indication by one of the following:
receiving from the target master node a handover request acknowledge message comprising the indication, or
receiving from the terminal device an SgNB release request acknowledge message comprising the indication.

8. The source master node device, of claim 6, wherein the transmission status comprises at least one of the following:
an uplink packet data convergence protocol sequence number for the data,
a hyper frame number receiver status for the data,
a downlink packet data convergence protocol sequence number for the data, or
a hyper frame number transmitter status for the data.

9. The source master node device, of claim 6, wherein the device is one of an evolved NodeBs, a terminal device, or a EUTRA-NR Next Generation NodeB.

10. A method, comprising:
receiving, by a target master node from a source master node, a request for inter-master node handover of a terminal device from the source master node to the target master node, wherein the terminal device has a plurality of split radio bearers terminated in a secondary node in dual connectivity comprising a connection to the source master node and to the secondary node;
in response to the reception, determining not to keep at least one radio bearer of the plurality of split radio bearers as a split radio bearer;
transmitting, by the target master node, to the source master node an indication that the at least one radio bearer is to be changed from a split radio bearer terminated in the secondary node to a Master Cell Group bearer terminated in the target master node, and
in response to the indication, receiving from the source master node or from the secondary node a transmission status of data associated with the at least one radio bearer.

11. The method of claim 10, wherein the method further comprises:
transmitting to a terminal device information concerning tunnel endpoints in a first device for the radio bearer; and
receiving the data from the terminal device via the tunnel endpoints.

12. A computer readable medium comprising a computer program for causing an apparatus to perform at least the method of claim 10.

13. A method, comprising:
transmitting, by a source master node to a target master node, a request for inter-master node handover of a terminal device from the source master node to the target master node, wherein the terminal device has a plurality of split radio bearers terminated in a secondary node in dual connectivity comprising a connection to the source master node and to the secondary node;
in response to the transmission, receiving an indication that at least one radio bearer of the plurality of split radio bearers is to be changed from a split radio bearer terminated in the secondary node to a Master Cell Group bearer terminated in the target master node;
receiving, in association with the receiving of the indication from the secondary node, a transmission status of data associated with the at least one radio bearer; and
transmitting to the target master node the transmission status of data associated with the at least one radio bearer.

* * * * *